United States Patent
Sonneland et al.

(10) Patent No.: US 6,240,370 B1
(45) Date of Patent: May 29, 2001

(54) METHOD OF PROCESSING SEISMIC DATA SIGNALS

(75) Inventors: Lars Sonneland, Tananger (NO); Per-Ola Tennebo, Chiswick (GB); Thomas Gehrmann, Hundvaag (NO); Oyvind Yrke, Sandnes (NO); Knut Steen Boge, Stavanger (NO); Gunnar Berge, Randaberg (NO)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/367,732
(22) PCT Filed: Feb. 18, 1998
(86) PCT No.: PCT/IB98/00209
  § 371 Date: Oct. 12, 1999
  § 102(e) Date: Oct. 12, 1999
(87) PCT Pub. No.: WO98/37437
  PCT Pub. Date: Aug. 27, 1998

(30) Foreign Application Priority Data
  Feb. 20, 1997 (GB) ................... 9703529

(51) Int. Cl.$^7$ ................... G01V 1/28
(52) U.S. Cl. ................... 702/17
(58) Field of Search ................... 702/14, 17, 18; 367/21, 24, 22, 39

(56) References Cited

U.S. PATENT DOCUMENTS 4,729,101 * 3/1988 Hanson et al. ................... 702/14

* cited by examiner

Primary Examiner—Donald E. McElheny, Jr.
(74) Attorney, Agent, or Firm—John H Bouchard

(57) ABSTRACT

A method is disclosed for characterizing the subsurface levels of the Earth with a greater degree of accuracy than hitherto. Seismic data samples are migrated and stacked, for example according to known techniques and then spectrum analyzed. The spectrum analysis is applied to a feature of the subsurface and, for example, a particular layer bounded by a pair of horizons would be subject to volume reflection spectral analysis. The analysis is carried out using an orthogonal base by defining the reflection signals in terms of coefficients to a set of orthogonal polynomials. Additional seismic characteristics or attributes may be directly calculated from the polynomial coefficients. These coefficients represent the characteristics of the layer to a high degree of accuracy and may be compared with spectra derived a priori (for example, synthetic spectra or previously characterized spectra) to further assist in analysis of measured seismic data.

11 Claims, 4 Drawing Sheets

METHOD OF PROCESSING SEISMIC DATA SIGNALS

BACKGROUND OF INVENTION

The present invention relates to a method of processing seismic data signals. Seismic data are collected in order to analyse the subsurface of the Earth, in particular for hydrocarbon exploration. The data for analysing sub sea structures may be collected on land or, over water, using sea-going vessels. In order to obtain the data a seismic source which may comprise explosives (on land) or an impulse of compressed air (at sea) is provided. The signals reflected by the various layers beneath the surface of the Earth are known as traces and are sensed by a large number, typically hundreds, of sensors such as geophones on land and hydrophones at sea. The reflected signals are recorded and the results are analysed to derive an indication of the layer formations beneath the subsurface. Such indications may then be used to assess the likelihood of hydrocarbon deposits.

However, the physical formation of layers beneath the surface do not always characterise the subsurface geology sufficiently well and the likelihood of hydrocarbon deposits are not assessed as accurately as is desired.

SUMMARY OF THE INVENTION

It is an object of the present invention to provide an improved method of processing and analysing seismic data signals.

According to the present invention there is provided a method of processing seismic data signals reflected by a particular subsurface feature, the method comprising analysis of the spectrum of the seismic data signals by decomposing the reflected signals with respect to a series of orthogonal polynomials and deriving a series of polynomial coefficients which characterise the reflectivity of the subsurface feature.

The invention provides a spectral decomposition of the reflected signals from a particular subsurface feature, for example a layer or a horizon. In the case of a layer this provides a quantification of the volume reflectivity (Volume Reflectivity Spectrum or VRS). The spectral decomposition is performed to an orthogonal base since spectral decomposition by Fourier transformations is not sufficiently accurate in the spectral analysis of seismic signals. The reason for this is that the signals to be analysed exist in short time windows and the infinite nature of the sinusoidal waveforms used in Fourier analysis result in undesirable window effects and side lobes.

A particular set of orthogonal polynomials which are a special set of Chebyshev polynomials are described but a variety of other orthogonal polynomials (in other words a different polynomial base) may be used.

Orthogonal polynomial functions have been used, in other contexts, for creating mathematical representations of received data. European Patent Application No. EP 0216609 A2, Seislith Development, for instance, discloses a method of using orthogonal polynomial functions to express reflection coefficients as functions of offset distances as part of a method for quantitatively relating reflection wave amplitude to corrected source-detector offset data.

Prior to the spectral decomposition, the seismic data may be resampled to ensure an equal number of (time or distance) samples at each point of a layer under investigation irrespective of its relative thickness at each position.

This spectral decomposition to an orthogonal base may also be applied to a priori or synthetic seismic data, for example well logs and data derived from elastic models. This synthetic data (or a priori knowledge) may then be compared with observed data to further characterise the observed data. This provides model-based compensation for transmission effects, spherical spreading and inelastic attenuation. To more accurately characterise the measured data, the synthetic data which provides the best match may be perturbated to provide a still better match.

Further preferred features of the present invention are set out in the dependent claims.

BRIEF DESCRIPTION OF THE DRAWING

The present invention will now be described, by way of example, with reference to the accompanying drawings, in which.

DETAILED DESCRIPTION OF THE PREFERRED EMBODIMENT

Figure 1:
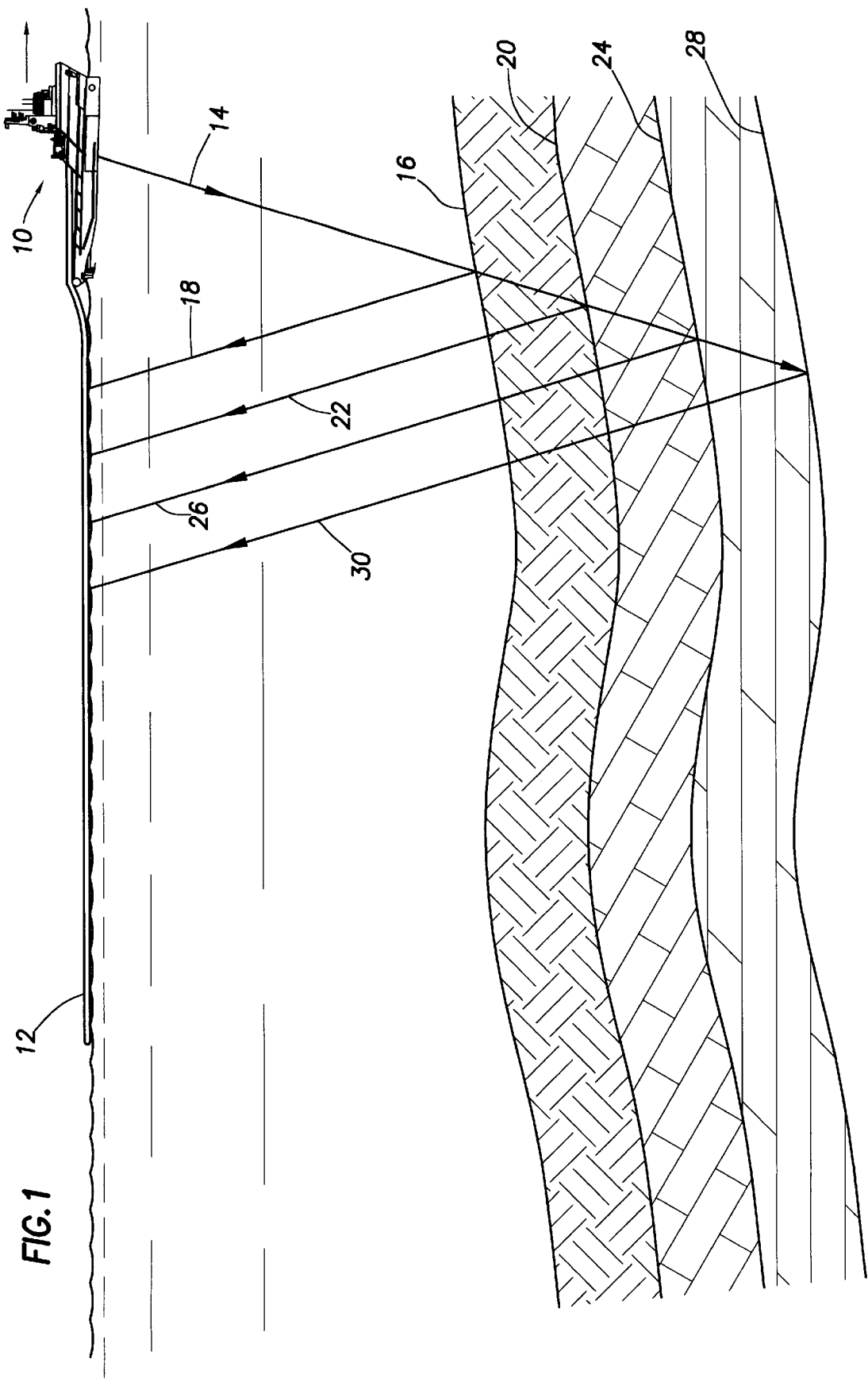
FIG. 1 shows a schematic view of seismic data collection using a seagoing vessel.

FIG. 1 shows a simplified schematic diagram of a seismic survey being conducted, in this instance over water. A ship 10 sails through the water towing a hydrophone cable 12. The cable 12 carries a large number of hydrophones (not shown) spaced out along its length. The hydrophone cable may be replaced by a hydrophone array, in other words a two dimensional arrangement of hydrophones. To collect seismic data an impulse signal 14 is provided at the ship which signal is directed toward the bottom of the sea. Numerous reflections will occur from the sea bed and the structure of the Earth beneath the sea bed. Only the major reflections 18, 22, 26 and 30 from the sea bed 16 and the seismic layers 20, 24 and 28 respectively are shown here for simplicity.

The collected seismic data signals have pre-processing applied. This will include "migration" in which the reflected signals are corrected for nonuniform reflecting layers and "stacking" in which the return signals from a given point are combined after adjustment to allow for sensing of the reflected signals at different sensors and the different speeds of sound waves through different structures and at different depths. These pre-processing techniques are well known in the art of seismic analysis and will not be discussed further here. In addition the wavefront of the reflected signal has been tracked continuously over the area of the survey by an automated wavefront-tracker. The reflection spectrum decomposition may then be applied.

Figure 2:
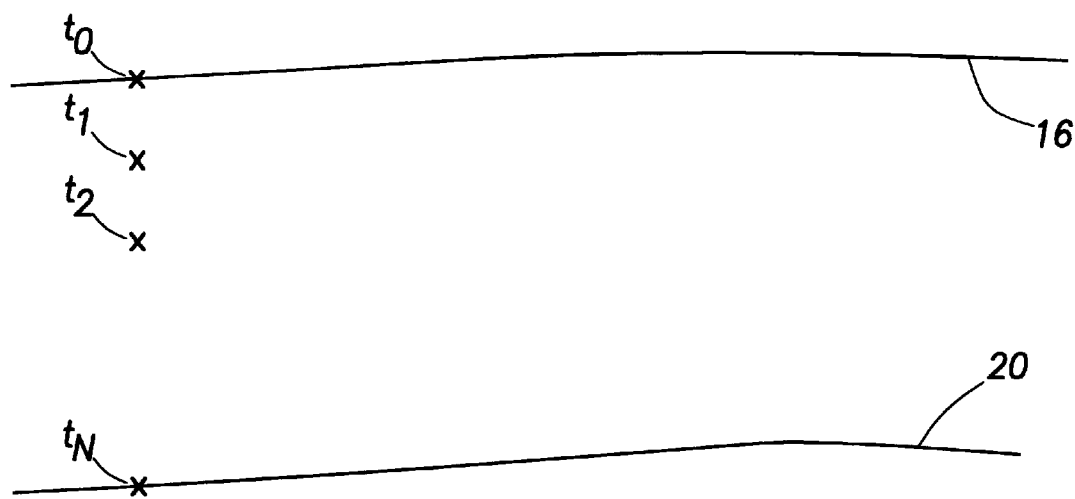
FIG. 2 shows a number of sample locations within a layer.

The wavefront-tracked and preprocessed signals are considered to be of the following form (or reflection function):

r=r(x,y,t)

for a particular wavefront in which:

x,y=zero trace index or position co-ordinates t=migrated travel time (or migrated depth co-ordinate), and r=reflection amplitude of a reflection signal Thus the amplitude of a reflection amplitude signal is provided at plurality of three-dimensional co-ordinates. FIG. 2 shows a plurality of time (depth) co-ordinates $t_0$, $t_1$, $t_2$ . . . $t_N$ between a horizon 16 and a horizon 20 at a given position (x,y). Prior art arrangements are known to identify the boundaries between layers (horizons) using this data and this goes some way to characterising the subsurface structure. It is now desired to quantify the reflectivity within a layer and to this end it is desired to derive a spectral analysis of the seismic data.

Spectral analysis of seismic data using the well-known Fourier analysis is not satisfactory. The infinite nature of the sine and cosine waves upon which Fourier analysis depends and the short duration nature of the seismic signals to be analysed result in window effects or side lobes which distort the analysis. The analysis in accordance with the present invention avoids this difficulty by deriving the spectral analysis of the signals without using Fourier transforms.

In order to perform the spectral analysis the reflection amplitudes of the reflection signal along the time (or depth) axis will be approximated. In this example this is carried out in a least square sense using orthogonal polynomials. One such set of orthogonal polynomials are the special set of Chebyshev polynomials $\{P_{m,N}\}$ which follow although other orthogonal polynomials may be used.

$$P_{0,N} = 1$$

$$P_{1,N} = 1 - \frac{2t}{N}$$

$$P_{2,N} = 1 - \frac{6t}{N} + \frac{6t(t-1)}{N(N-1)}$$

$$P_{3,N} = 1 - \frac{12t}{N} + \frac{30t(t-1)}{N(N-1)} - \frac{20t(t-1)(t-2)}{N(N-1)(N-2)}$$

$$P_{4,N} = 1 - \frac{20t}{N} + \frac{90t(t-1)}{N(N-1)} - \frac{140t(t-1)(t-2)}{N(N-1)(N-2)} + \frac{70t(t-1)(t-2)(t-3)}{N(N-1)(N-2)(N-3)}$$

Generally $$P_{m,N}(t) = \sum_{i=0}^{m} (-1)^i \binom{m}{i}\binom{m+i}{i} \frac{t(t-1)(t-2)\ldots(t-i+1)}{N(N-1)(N-2)\ldots(N-i+1)}$$

where $$\binom{m}{i}$$

are the binomial coefficients, N is the number of sampling points and $$\binom{m}{i} = \frac{m!}{i!(m-1)!}$$

We now derive a set of coefficients $\{c_k\}$ for an observed seismic signal or more accurately, for a set of volume reflection amplitudes. The coefficients are derived by making a least square fit between the polynomials and the measured volume reflection amplitudes. To do this the respective coefficient-polynomial products are subtracted from the signal a(t), the result is squared and summed over all values of t (sample times or distances). The following signal S is thus to be minimised with respect to the coefficient values $\{c_k\}$:

$$S = \sum_{t=0}^{N} [a(t) - c_0 P_{0,N}(t) - c_1 P_{1,N}(t) \ldots - c_m P_{m,N}(t)]^2$$

which means that to minimise S the normal equations become:

$$\frac{\partial S}{\partial c_k} = -2\sum_{t=0}^{N} [a(t) - c_0 P_{0,N}(t) - c_1 P_{1,N}(t) \ldots - c_0 P_{0,N}(t)]P_{k,N}(t) = 0$$

for k=0, 1, 2, . . . , N

Since the set of polynomials are orthogonal, however, the parameters can be solved for individually, which gives:

$$\sum_{t=0}^{N} [a(t) - c_k P_{k,N}(t)]P_{k,N}(t) = 0$$

Solving this equation for the coefficient $C_K$ gives:

$$c_k = \frac{\sum_{t=0}^{N} a(t) P_{k,N}(t)}{\sum_{t=0}^{N} P_{k,N}^2(t)}$$

The set of coefficients $\{c_k\}$ represents the spectral decomposition of the volume reflection amplitudes. In mathematical terms, $\{c_k\}$ represents the set of eigenvalues to the eigenfunctions $\{P_{k,N}\}$ used to decompose the signal a(t). It is desirable to have the smallest number of coefficients (ie. the lowest value of k) commensurate with sufficient accuracy since this simplifies the subsequent processing.

The VRS-polynominals can represent the seismic samples without error provided high enough order of the polynominal decomposition is chosen. This implies that if there are N samples in the time window a polynominal decomposition of order N−1 will give an exact error-free reconstruction of the samples. If the decomposition is of order less than N−1 we will have an approximation (least mean square error).

In order for the described particular set of polynomials $P_{m,N}$ to be orthogonal they must be sampled equidistantly. In other words, the number of seismic samples N in the layer under consideration must be uniform for a given layer. This may not be case for a layer whose thickness is not uniform but this can be remedied as follows. Broadly, the signals are re-sampled from their original sample rate to provide the same number of sample values at each given (x,y) co-ordinate position in the area under survey. Thus, shallower sections of the layer will have more closely spaced sample points (with respect to time or depth) while in the deeper sections such points will be more spaced out.

The spectra can also be computed from the observation data where a well intersects the seismic volume. These spectra can then be used in the classification similar to the synthetically derived spectra.

In more detail, the procedure is as follows. The maximum thickness of the layer may be calculated by finding the maximum value of:
$\Delta f(x,y) = f_2(x,y) - f_1(x,y)$ where the layer is defined by horizons as follows:
$f_1(x,y)$=the shallowest horizon (ie. the top surface of the layer)
$f_2(x,y)$=the deepest horizon (ie. the bottom surface of the layer)
The number of sample points can then be calculated from:

$$N = \frac{\max \Delta f(x, y)}{\Delta t} + 1$$

where $\Delta t$=the sample rate along the depth or time axis

In other words, the maximum thickness of the layer, divided by the sample rate plus one. The extra sample point is required so that a sample point lies on both surfaces of the layer.

Figure 3:
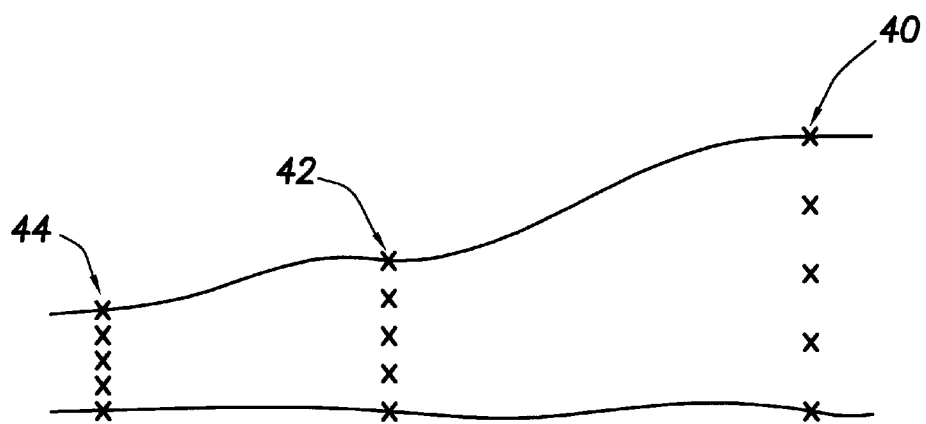
FIG. 3 shows an elevational view of re-sampled data points in a layer having a non-uniform thickness.

Those (x,y) positions with fewer samples than N will have to be interpolated to have N samples. A suitable technique is to use a sinc interpolator and such an interpolation filter having seven points is suitable. A different interpolation filter and/or a more accurate sinc interpolator could be used if required. Alternatively, or in addition, a Hanning filter may be applied to the interpolated samples to compensate for the finite length of the interpolation filter (the effect of filter truncation). FIG. 3 gives a schematic view of the interpolation procedure. At the widest position 40 of a seismic layer there are 5 (for example) samples in the time (or depth) direction. At the thinnest portion 44 of the seismic layer there would only be a likelihood of two or three samples present. After interpolation, however, there are 5 sample points at each position within the layer, including a position 42 having intermediate depth.

Figure 4:
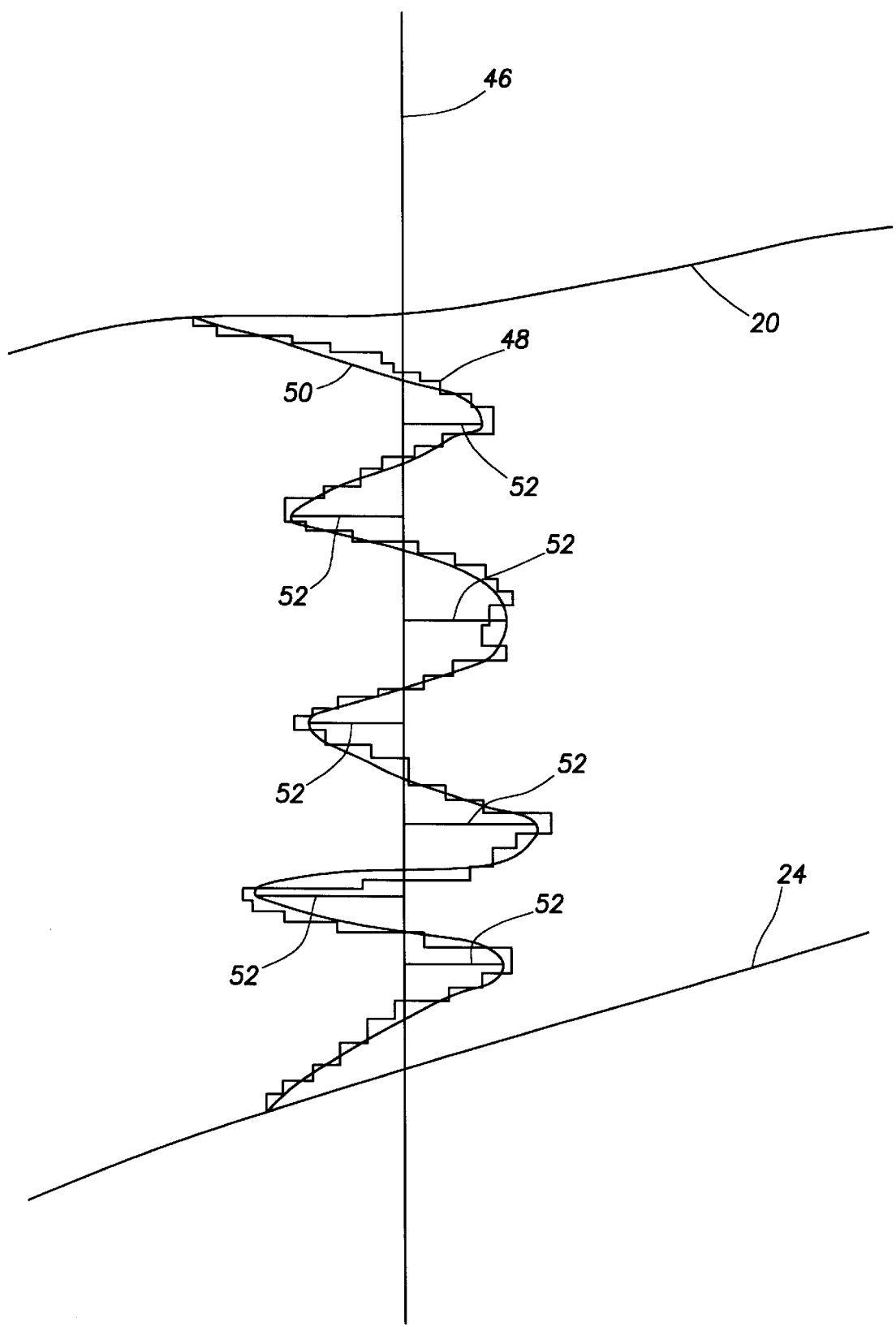
FIG. 4 shows a seismic data trace, a reconstructed trace, and the extrema values from the reconstructed trace.

FIG. 4 shows a reference axis 46 and a portion of an example seismic data trace 48 associated with a particular x,y location represented by the reference axis. As discussed above, the seismic data trace 48 will typically be output from preprocessing steps that improve the quality of the seismic data signal. In this view, the seismic data trace 48 is displayed with depth (in time or distance) increasing toward the bottom of FIG. 4 and with seismic amplitude being displayed as the distance between the seismic data trace 48 and the reference axis 46. The seismic data trace 48 is displayed in step function format because the vast majority of seismic data is acquired digitally. The number of data points available within a particular layer will obviously depend significantly both on the thickness of the layer and the sampling interval of the data.

FIG. 4 also shows a reconstructed trace 50 that graphically represents the sum of the derived polynomial coefficients multiplied by their respective orthogonal polynomial functions. This reconstructed trace 50 shows how closely the derived series of orthogonal polynomials approximate the seismic data trace 48 between horizon 20 and horizon 24. While increasing the number of polynomial coefficients used will decrease the difference between the seismic data trace 48 and the reconstructed trace 50, typically only between 5 to 10 coefficients are used in the approximation process. Limiting the number of coefficients simplifies subsequent processing and eliminates higher order coefficients that may have attenuated associations with true subsurface conditions. Once an appropriate number of coefficients has been selected for a particular data set, it is important that the same number of coefficients be derived for other traces in the data set to allow the values of the coefficients to be appropriately compared.

Also shown in FIG. 4 are extrema values 52 which consist of the local maximums and minimums of the reconstructed trace 50. The number of extrema values, the sign of the extrema values (positive vs. negative, maxima vs. minima), the magnitude of the extrema values, and the location of the extrema values along reference axis 46 can also be calculated directly from the derived polynomial coefficients. Each of these attributes can be useful in characterizing subsurface conditions between horizon 20 and horizon 24.

The extrema values 52 represent the internal reflectors that are present within a particular layer and the disclosed method is particularly useful in the automatic detection of reflectors within a layer.

By observing changes in the derived polynomial coefficients and/or the number, sign, magnitude, and/or location of the extrema values, it is possible to remotely sense geologic features present within a layer, such as channels or fractures, or to determine the location of other important subsurface features, such as the location of the oil/water interface within a reservoir. Sorting rules can be established to allow a computer-based system implementing the inventive method to automatically identify and isolate geologic features and other subsurface items of interest in a set of seismic data using the derived seismic characteristics.

Other seismic characteristics (or attributes) can also be calculated using the derived polynomial coefficients. The magnitude of the difference between the seismic data trace 48 and the reconstructed trace 50 can be calculated, for instance. This magnitude can provide a third type of attribute that can be used to characterise the seismic data.

Synthetic spectra that can be used to compare and characterise the spectra from the measured signal can also be derived. It is important that the synthetic spectra are provided in the same spectral domain as the measured spectra (calibrated to the observed data). Such synthetic spectra may be derived from a number of assumptions about the Earth or from actual measured values of areas that have been characterised by actual drilling and so on.

Once the synthetic spectra and the measured spectra are represented in a common spectral domain then a comparison may be carried out to determine a "best match". The best match is also derived from a least squares fit in a manner analogous to that used to derive the coefficients for the orthogonal polynomial. Once a synthetic best match has been determined it is then possible to perturb the best match to generate a further range of synthetic spectra. The observed data is then further compared with the perturbed synthetic spectra. The comparison between the synthetic spectra and the observed spectra can be conducted by geostatistical classification system. The parameters under which such system operates are defined by the user. The best match for a given set of observation data is assigned a probability value to indicate the likelihood of correct classification. If a set of observed data have an equal probability of belonging to two or more classes, they are assigned to a doubt class. Observations that fail to be assigned to a class (because they are such a poor match to all of the available classes) are assigned to an outlier class.

The present invention is equally applicable to the analysis of a single horizon. The seismic source will generate a pulse or signal having a finite time duration. Thus a return seismic signal will be analysed in a constant time window which includes the horizon in question.

Figure 5:
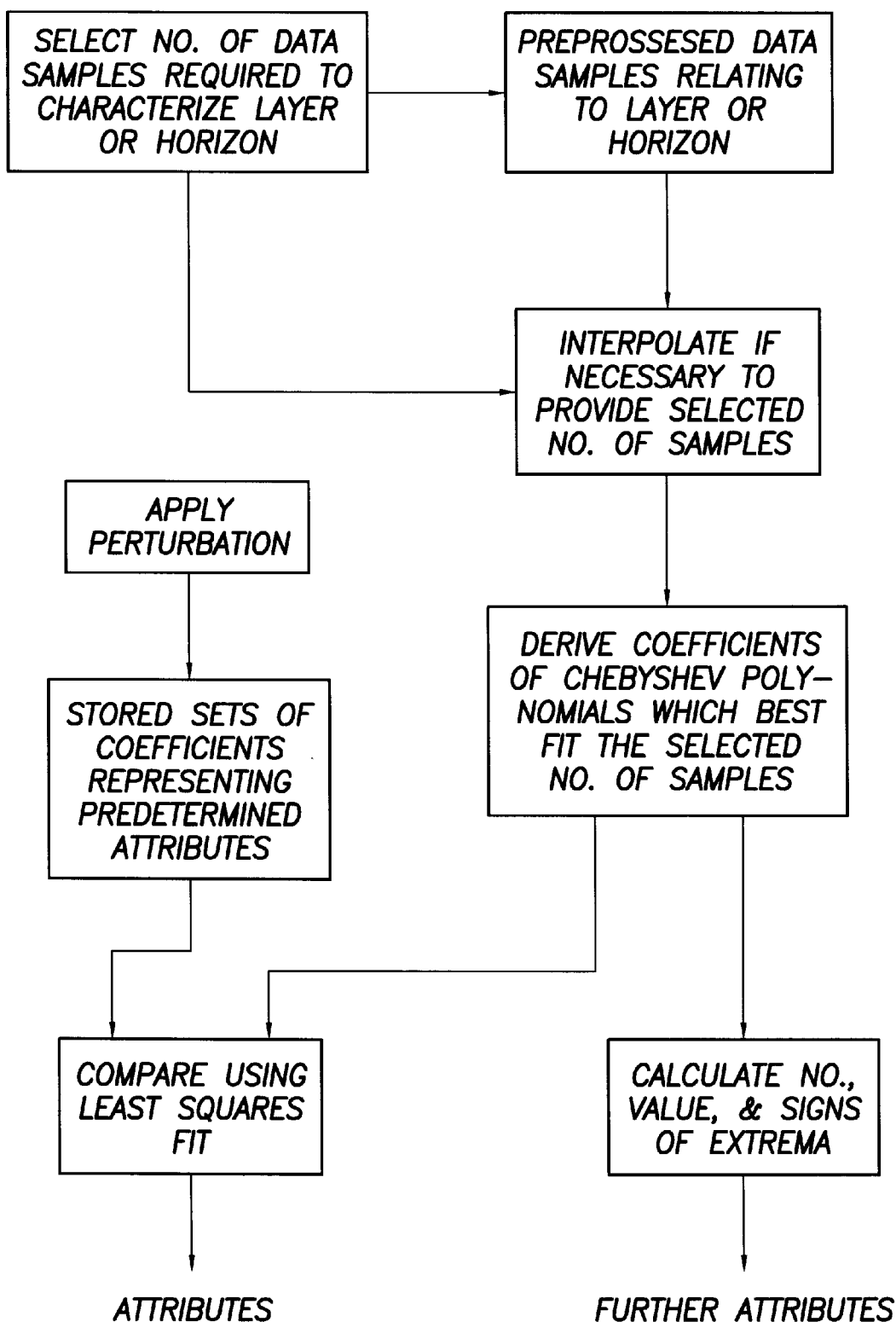
FIG. 5 is a flow chart of a preferred seismic data processing method in accordance with the present invention.

The principal data processing steps of the seismic data processing technique described above with reference to FIGS. 2 to 4 are set out in flow chart form in FIG. 5.

The present invention includes any novel feature or novel combination of features disclosed herein, either explicitly or implicitly.

What is claimed is:

1. A method of processing seismic data signals reflected by a particular subsurface feature, the method comprising analysis of the spectrum of the seismic data signals by decomposing the reflected signals with respect to a series of orthogonal polynomials and deriving a series of polynomial coefficients which characterise the reflectivity of the subsurface feature.

2. A method as claimed in claim 1, wherein the subsurface feature comprises a layer defined by two horizons and the series of polynomial coefficients represents a volume spectral analysis.

3. A method as claimed in claim 1, wherein the subsurface feature comprises a horizon.

4. A method as claimed in claim 1, wherein the set of orthogonal polynomials comprises a set of Chebyshev polynomials.

5. A method as claimed in claim 1, further comprising a comparison between the characterised subsurface feature and a plurality of predetermined characterisations of subsurface features, wherein the closest match between the characterised feature and a predetermined characterisation is determined.

6. A method as claimed in claim 5, wherein the predetermined characterisation having the closest match to the characterised feature is determined using a least squares fit.

7. A method as claimed in claim 6, wherein a predetermined characterisation having the closest match is perturbed to provide at least one further predetermined characterisation for comparison with the characterised feature.

8. A method as claimed in claim 1, further comprising the calculation of an additional attribute of the seismic data signals using the derived polynomial coefficients.

9. A method as claimed in claim 8, wherein the additional attribute comprises a number, sign, magnitude, or location of extrema values of a reconstructed trace generated by summing the derived polynomial coefficients multiplied by their respective orthogonal polynomial functions.

10. A method as claimed in claim 8, further comprising the remote sensing of geologic or subsurface features by observing changes in the derived polynomial characteristics or the additional attribute.

11. A method as claimed in claim 8, wherein the additional attribute represents an internal reflector within a layer.

* * * * *